United States Patent [19]
Burkhard

[11] Patent Number: 5,924,091
[45] Date of Patent: Jul. 13, 1999

[54] DATABASE SYSTEM WITH IMPROVED METHODS FOR RADIX SORTING

[75] Inventor: Neil A. Burkhard, Westford, Mass.

[73] Assignee: Sybase, Inc., Emeryville, Calif.

[21] Appl. No.: 08/704,069

[22] Filed: Aug. 28, 1996

[51] Int. Cl.$^6$ ................................................. G06F 17/30
[52] U.S. Cl. ........................................ 707/7; 707/2; 707/1
[58] Field of Search .......................................... 707/7, 1, 2

[56] References Cited

U.S. PATENT DOCUMENTS

| | | | |
|---|---|---|---|
| 4,809,158 | 2/1989 | McCauley | 364/200 |
| 5,440,734 | 8/1995 | Wagar | 707/7 |
| 5,490,269 | 2/1996 | Cohn et al. | 707/7 |
| 5,560,007 | 9/1996 | Thai | 707/3 |
| 5,666,528 | 9/1997 | Thai | 707/102 |
| 5,678,043 | 10/1997 | Ng et al. | 707/101 |
| 5,680,607 | 10/1997 | Brueckheimer | 707/7 |

OTHER PUBLICATIONS

McIlroy, P. and Bostic, K., "Engineering Radix Sort," Computing Systems, 1993, pp. 5–27.

*Primary Examiner*—Paul V. Kulik
*Assistant Examiner*—Greta L. Robinson
*Attorney, Agent, or Firm*—John A. Smart

[57] ABSTRACT

System and methods are described for improved sorting of information records. The system provides radix sorting on native data types—that is, without the resource-expensive approach of converting data types into character representations. A correct interpretation of a group of bits under examination is provided by the system at the point of examination by a radixsort engine. "Sort plan" information is provided to the radixsort engine instructing it how a particular set of bits should be interpreted for purposes of comparison. The knowledge includes a "comparison type" for a set of bits under exam. This is employed by the engine to determine an appropriate "weighting" of each group of bits—how each group should be treated at the point of comparison. The engine itself operates generically: it simply operates on the set of bits as specified by the sort plan entries, regardless of the particular data types which comprise the bits or the one or more keys from which the bits are derived. In this manner, the system can enable the radixsort engine to properly interpret groups of bits, for undertaking a comparison operation for different types, thereby avoiding the undesirable task of converting data types into character representations.

42 Claims, 5 Drawing Sheets

Microfiche Appendix Included
(1 Microfiche, 46 Pages)

DATABASE SYSTEM WITH IMPROVED METHODS FOR RADIX SORTING

MICROFICHE APPENDIX

A single-fiche Microfiche of 46 frames, which contains Appendix A and Appendix B, is included with this application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data processing environments and, more particularly, to system and methods for improved sorting of data records in those environments.

Perhaps one of the most fundamental tasks to the operation of computers is sorting—the process of arranging a set of similar information into a desired order. While employed in virtually all database programs, sorting routines are also extensively used in many other areas. Common examples include compilers, interpreters, and operating system software. And in many instances, the quality and performance of such software is judged by the efficiency of its sorting techniques. Since sorting methodology plays such an important role in the operation of computers and other data processing systems, there has been much interest in seeking ways to improve existing systems and methods. Historically, techniques for sorting information are divided into three general methods: exchange, selection, and insertion. Each will now be reviewed in turn.

To sort by exchange, a system swaps or "exchanges" out-of-order information until all data members are ordered. Perhaps the best-known example of exchange sorting is the infamous "bubble sort." The general methodology behind the bubble sort is that of repeated comparisons and attendant exchanges of adjacent members. In this manner, the method is analogous to bubbles in water, where each bubble percolates to its proper level.

As shown by the following C language example, a bubble sort method keeps passing through a set of members, exchanging adjacent elements as needed.

```
bubble(int a[ ], int N)
{
    int i, j, t;
    for (i = N; i >= 1; i--)
        for (j = 2; j <= i; j++)
            if (a[j - 1] > a[j])
                {t = a[j - 1]; a[j- 1] = a[j] = t;}
}
```

When no more exchanges are required, the set is sorted. Observe that the number of comparisons for a bubble sort is always the same; particularly, the two "for" loops will repeat a specified number of times, regardless of when the list is ordered. This observation may be generalized as follows: the bubble sort will always perform $\frac{1}{2}(n^2-n)$ comparisons, for "n" number of elements to be sorted. In other words, the outer loop executes n−1 times, while the inner loop executes n/2 times.

Having considered the number of possible comparisons, next one should consider the possible number of exchanges required by the bubble sort. For an already sorted list (best case), no exchanges are required (i.e., the number of exchanges equals zero). As a list becomes less ordered, however, the number of elements that are out of order approaches the number of comparisons. The end result is that the execution time approaches a multiple of the square of the number of elements, making the bubble sort unusable for large sorts.

A selection sort, perhaps one of the simplest sorting algorithms, proceeds as follows. A system continually chooses or "selects" a data member from one extreme of possible values, such as the lowest-value member, until all members have been selected. Because the system always selects the lowest-value member from those remaining, the set will be ordered from lowest to highest-value member when the process is completed. The sort may be implemented by the following C code:

```
selection(int a[ ], int N)
{
    int i, j, min, t;
    for (i = 1; i < N; i++)
    {
        min = i;
        for (j = i + 1; j <= N; j++)
            if (a[j] < a[min]) min = j;
        t = a[min]; a[min] = a[i]; a[i] = t;
    }
}
```

As shown by this code snippet, the method first finds the lowest-value element in an array and exchanges it with the element in the first position. Next, the second smallest element is located and exchanged with the element in the second position. The process continues in this way until the entire array is sorted.

Like the bubble sort, the outer loop above executes n−1 times, while the inner loop executes $\frac{1}{2}(n)$ times. Thus, the technique requires roughly $n^2$ comparisons, making it also too slow for processing a large number of items.

In a sort by insertion, the system examines a data member and places or inserts that member into a new set of members, always inserting each member in its correct position. The sort is completed when the last member has been inserted. This sort technique may be implemented as follows:

```
insertion(int a[ ], int N)
{
    int i, j, v;
    for (i = 2; i <= N; i++)
    {
        v = a[i]; j = i;
        while (a[j - 1] > v)
            {a[j] = a[j - 1]; j--; }
        a[j] = v;
    }
}
```

Unlike the previous two sorting techniques, however, the number of comparisons that occur with this technique depends on the initial order of the list. More particularly, the technique possesses "natural" behavior; that is, it works the least when the list is already sorted and vice versa, thus making it useful for lists which are almost in order. Also, the technique does not disturb the order of equal keys. If a list is sorted using two keys, the list will remain sorted for both keys after an insertion sort.

A particular concern for any sort method is its speed, that is, how fast a particular sort completes its task. The speed with which an array of data members can be sorted is directly related to the number of comparisons and the number of exchanges which must be made. Related to the characteristic of speed is the notion of "best case" and "worst case" scenarios. For instance, a sort may have good speed given an average set of data, yet unacceptable speed given highly disordered data.

One technique for reducing the penalty incurred by exchanging full records is to employ a method which operates indirectly on a file, typically using an array of indices, with rearrangement done afterwards. In this manner any of the above sorting methods may be adapted so that only n "exchanges" of full records are performed. One particular approach is to manipulate an index to the records, accessing the original array only for comparisons. In other words, it is more efficient to sort an index to the records than incurring the cost of moving large records around excessively.

Since all of the simple sorting techniques above execute in $n^2$ time, their usefulness for sorting files with a large number of records is limited. In other words, as the amount of data to be sorted increases, the execution speed of the technique becomes exponentially slower, at some point, too slow to use. Thus, there has been great interest in developing improved techniques for sorting information.

Perhaps the best-known improved sorting technique is quicksort, invented in 1960. Quicksort's popularity is due in large part to its ease of implementation and general applicability to a variety of situations. Based on the notion of exchange sorting, it adds the additional feature of "partitions", which will now be reviewed.

With quicksort, a value or "comparand" is selected for partitioning the array into two parts. Those elements having a value greater than or equal to the partition value are stored on one side, and those having a value less than the partition value are stored on the other side. The process is repeated for each remaining part until the array is sorted; as such, the process is essentially recursive. The quicksort "divide-and-conquer" method of sorting may be implemented by the following recursive function:

```
quicksort(int a[ ], int 1, int r)
{
    int i;
    if (r > 1)
    {
        i = partition(1, r);
        quicksort(a, 1, i - 1);
        quicksort(a, i + 1, r);
    }
}
```

Quicksort is not without its disadvantages, however. Being recursive in nature, the technique usually requires that a significant amount of stack-based memory be reserved. Moreover, the technique, which is particularly sensitive to long common substrings, exhibits nonlinear behavior. This nonlinearity may be summarized as follows: $c_1*n*\log 2(n)$. The constant $c_1$ is approximately proportional to the average compare length, that is, the average point where two records differ. In the case of many common substrings in the data, or just many duplicates, the average compare length is fairly large, thus affecting the total sort time accordingly. In particular, every character in every record in the first "average compare length number of" characters is used an average of $\log 2(n)$ times.

The basic theory and operation of these and other sorting and search techniques are well documented in the technical and trade literature. A general introduction to the topic may be found in Sedgewick, R., *Algorithms in C*, Addison-Wesley, 1990. A more detailed analysis of the topic may be found in Knuth, D., *Sorting and Searching*, The Art of Computer Programming: Vol. 3, Addison-Wesley, 1973.

More advanced techniques are described in the patent literature. For instance, Sorting Method and Apparatus, U.S. Pat. No. 4,809,158, describes a method for sorting records where the records are placed in various bins depending on the character on which the record is presently being sorted. The bins, in turn, are linked together. The records from a first bin are then sorted again on the next letter of the record, and so on until the records are fully ordered and placed in a "Done" area. Next, records from the second bin are put into final order and placed into the "Done" area, being appended to the already sorted records from the first bin. The process continues taking records from successive bins, ordering the subgroup, and appending it to the "Done" group, until the entire collection is sorted. Despite advantages over quicksort technique, the described method has a pronounced limitation. In particular, the linking together of records incurs a substantial cost in terms of memory requirements. For instance, sorting one million records would require an extra four megabytes of memory, if linked.

The disclosure of each of the foregoing references is hereby incorporated by reference.

The sorting methodology employed in many commercial products today is based on the above-described quicksort approach. A particular problem with quicksort (and its variants), however, is the number of comparisons required to properly sort data, especially as the number of data records in a set grows in size. In large scale databases, such as those employing millions of records, a corresponding large number of comparisons is highly problematic. This basic problem is exacerbated by the tendency to support data fields storing longer key values (e.g., character or text strings of 256 bytes or larger), as well as the problems attendant to comparisons across different types of data. In this regard, even an individual comparison (i.e., of one data record to another) often entails a high number of comparisons of the data values (e.g., characters, bytes, and the like) which comprise those data values. Still further, a comparison might entail multiple keys, thus requiring a system to involve multiple columns in the comparison operation.

Another aspect of quicksort-based routines is their recursive nature. Since the quicksort methodology is designed to recursively invoke itself, a system must have sufficient stack space available for supporting such a recursive operation. For powerful (and expensive) work stations, such a requirement does not pose a particular problem. More modest systems, such as low-end work stations or personal computers, on the other hand, might have insufficient memory resources to support a recursive operation once the underlying data set reaches a large size.

SUMMARY OF THE INVENTION

System and methods are described for improved sorting of information records. The system provides radix sorting on native data types—that is, without the resource-expensive approach of converting data types into character representations.

A correct interpretation of a group of bits under examination is provided by the system at the point of examination by a radixsort engine. "Sort plan" information is provided to the radixsort engine instructing it how a particular set of bits should be interpreted for purposes of comparison. The sort plan itself is broken down into an array of entries; each entry describes the number of bits to examine (e.g., the number 8 for a radix 8 sort), together with information on how to interpret the bits. The group of bits (radix) can be an arbitrary number of bits, for instance, ranging from 8 to 32 bits. For performance reasons, the number of bits to examine typically is selected to optimize alignment of machine words for a particular platform. For typical hardware, the value is limited to no more than 11, to avoid excessive memory requirements. In the event that the sort is processing variable-length keys, the sort plan also describes the length offset, so that the appropriate offset can be found in each key. Additionally, the system tracks a "current position" in the variable-length key.

This enables the system to correctly compare entries of different lengths (e.g., comparing an entry of 10 bytes in size against one of only 5 bytes in size).

Once the sort plan is constructed, the radixsort can be performed in a straightforward manner, without unnecessary conversion of data types into character-based (or other) data types. The sort plan information is employed by a sorting engine to determine a "weighting" of each group of bits— how each group should be treated at the point of comparison. The engine itself operates generically: it simply operates on the set of bits as specified by the sort plan entries, regardless of the particular data types which comprise the bits or the one or more keys from which the bits are derived. In other words, the sort is performed by processing a sequence of bit sets against a corresponding set of sort plan entries, each entry describing how a particular bit set is to be processed. In this manner, the system can enable the radixsort engine to properly interpret groups of bits, for undertaking a comparison operation for different data types, thereby avoiding the undesirable task of converting data types into character representations.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment requiring sorting of data. The description of the exemplary embodiments which follows is, therefore, for the purpose of illustration and not limitation.

Standalone System Hardware

Figure 1A:
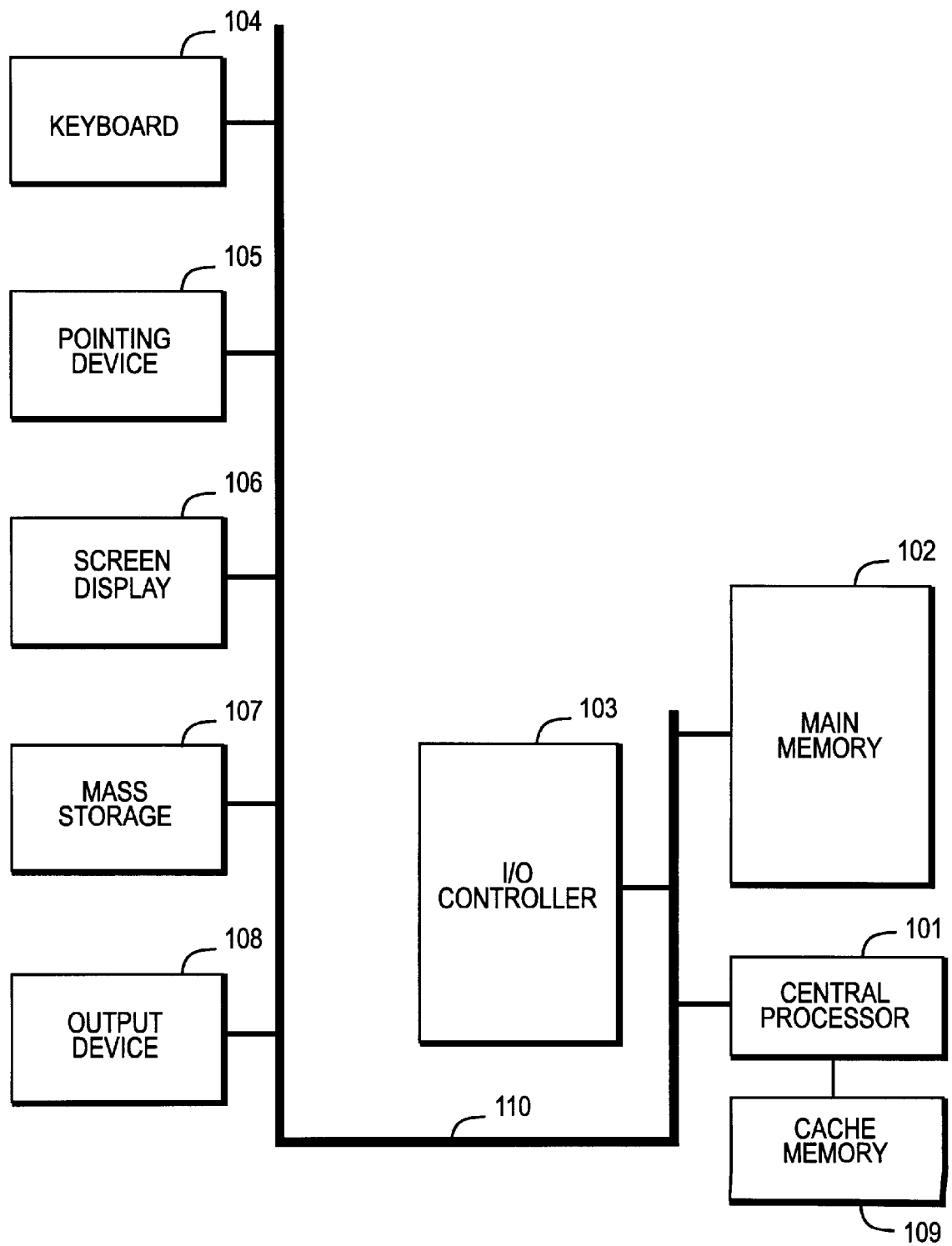
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
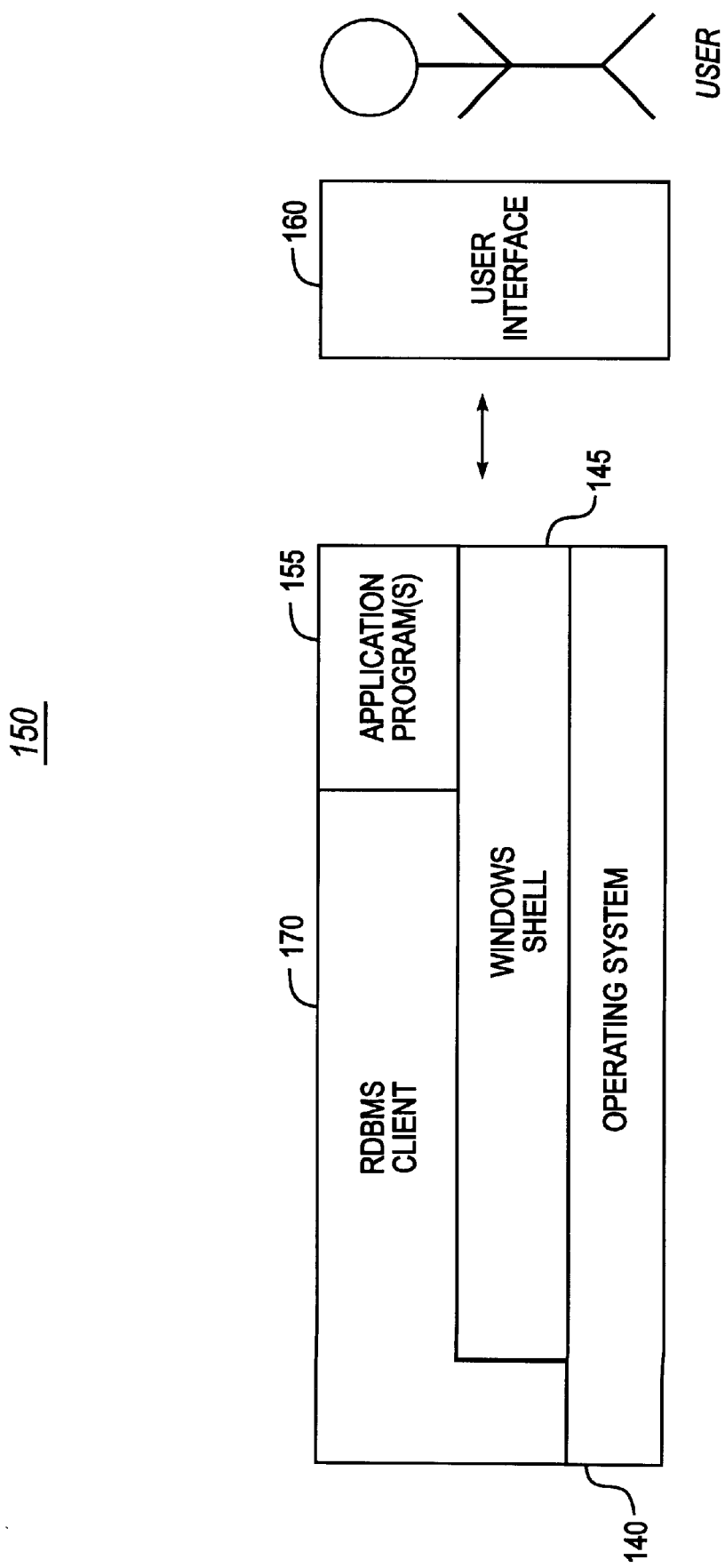
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands as input and displaying user data as output.

Also shown, the software system 150 includes a Relational Database Management System (RDBMS) front-end 170. The RDBMS front-end 170 may comprise any one of a number of database front-ends, including PowerBuilder™, dBASE®, Paradox®, Microsoft® Access, or the like. In an exemplary embodiment, the front-end will include SQL access drivers (e.g., Borland SQL Links, or Microsoft ODBC drivers) for accessing SQL database server tables in a Client/Server environment.

Client/Server Database Management System

Figure 2:
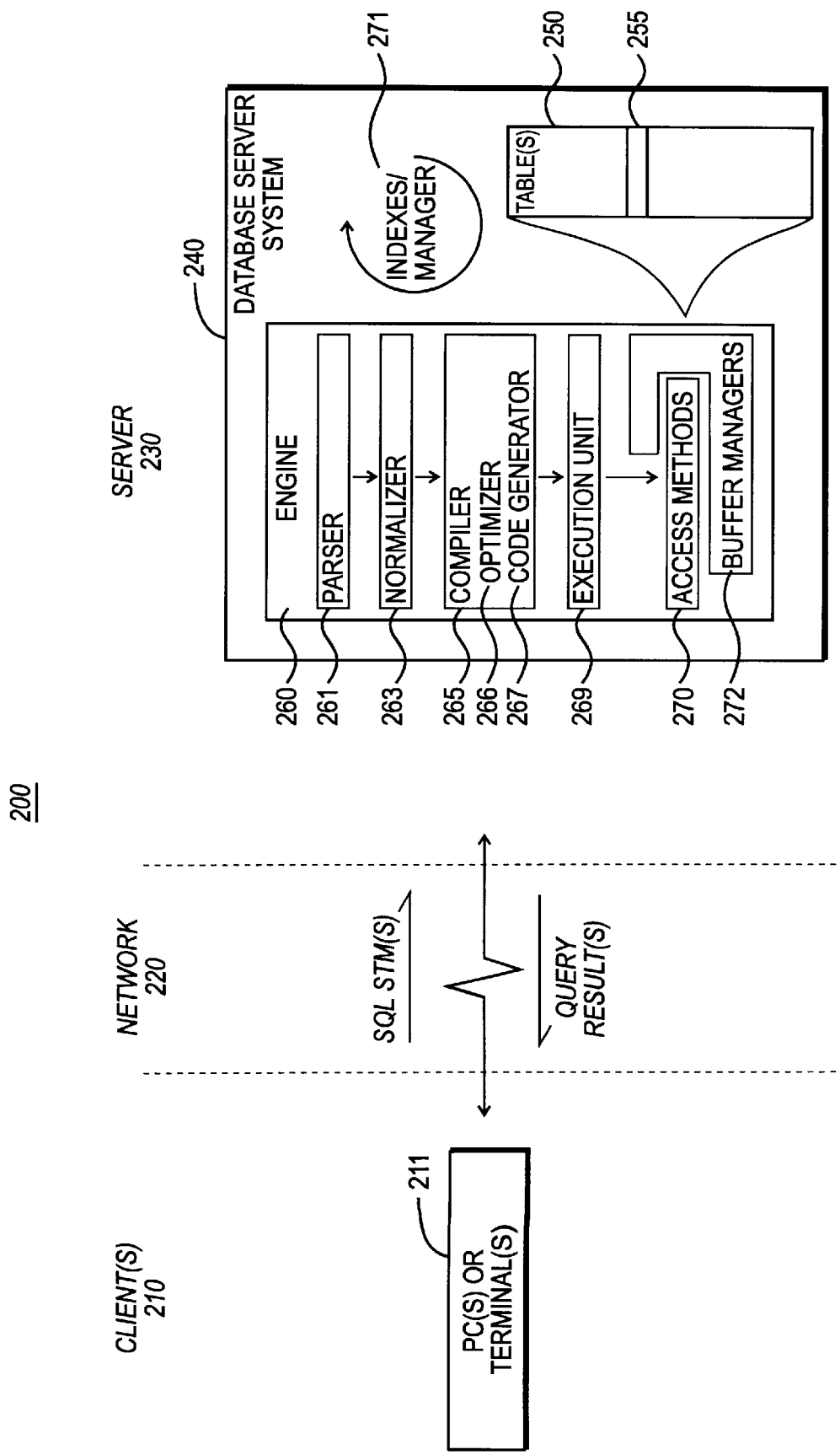
FIG. 2 is a block diagram of a client/server system in which the present invention is preferably embodied.

While the present invention may operate within a single (standalone) computer (e.g., system 100 of FIG. 1A), the present invention is preferably embodied in a multi-user computer system, such as a client/server system. FIG. 2 illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (Sybase of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like).

The Network includes functionality for packaging client SQL calls and its parameters into a format (of one or more packets) suitable for transmission across a cable or wire, for delivery to the Database Server 240.

Client/server environments, database servers, and networks are well documented in the technical, trade, and patent literature. For a general discussion of database servers and client/server environments, see, e.g., Nath, A., *The Guide to SQL Server*, Second Edition, Addison-Wesley Publishing Company, 1995. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or records (tuples); each record 255 comprises columns or fields of information. A database record, therefore, includes information which is most conveniently represented as a single unit. A record for an employee, for example, may include information about the employee's ID Number, Last Name and First Initial, Position, Date Hired, Social Security Number, and Salary. Thus, a typical record includes several categories or fields of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

For enhancing the speed in which the Database Server stores, retrieves, and processes particular data records, the Server maintains one or more database indexes 271 on the table, for presented sorted views of the records. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. The ability to sort information, whether for re-ordering the records or for creating a sorted index, is crucial to the performance of database systems.

Improved sorting methodology

A. Introduction

A first approach to improving sorting is to apply a "radix" sort. The term "radix" suggests a comparison of contiguous groups of bits, where the "radix" of the sort reflects the base number of bits which are employed for each comparison operation. A sort of radix 11, for instance, is a sort which includes the comparison of (groups of) 11 bits at a time. The radix, therefore, reflects an arbitrary number of bits which are being compared at one time. The data itself is being sorted on the value (as interpreted by the system) of each particular set of bits. The knowledge (or relevance) of data types (e.g., integer, float, or the like) is lost at this point of actual comparison. Instead, the system is dealing with an array or list of bits.

In a radixsort, there generally exists a tradeoff between performance and resource requirements. In general, the larger the radix the better the performance (i.e., in speed of execution) but, at the same time, more memory space is required. Performance is increased with a larger radix since less comparisons occur—that is, more bits are being compared at each comparison operation. Consider, for instance, a sort on data which is 32 bits wide. A radix 1 sort would require 32 passes over the data. On the other hand, a sort of radix 8 would require 4 passes over the data and, thus, would operate faster. Still further, a sort of radix 32 would require only 1 pass over the data and, therefore, would operate the fastest. As the number of bits employed increases, the amount of memory required for storing information required for performing the sort increases as well. Therefore, increasing the radix entails a tradeoff.

Because conventional radixsort is a method which only examines bits without knowledge of underlying data types, an issue exists as to how one correctly sorts machine types, such as Booleans, floating point numbers, integer numbers (including unsigned integers), and the like, with just the knowledge of the bits. Consider, as a simple case, an examination of data comprising alpha text (i.e., alphabetic text). With ASCII codes, the character "a" is less than the character "z." Here, the actual numeric value of the ASCII character "a" in fact represents the weighting for the character. As a result, such data can be sorted directly. Consider, on the other hand, non-alphabetic data, such as floating point numbers or signed integers. For these data types, the underlying numeric values no longer represent appropriate weightings for use in a sort. Because a computer system applying conventional radixsort does not have knowledge of the data type at the time of comparison, it cannot interpret each bit individually. The system has no way of knowing whether a particular bit is the most significant bit or the least significant bit for a given set of bits.

The conventional approach to this problem is to perform the radixsort by first converting all the data, regardless of data type, into an ASCII (text) string. Then, the radixsort can be performed by simply treating the data, regardless of original type, as text. This approach is suboptimal, however. Floating point data types, for instance, include a significant resource (computational) cost when converting into a text format. The very operation of formatting such data out to a text version of a number is itself an expensive operation. This overhead is also incurred for other data types which must be first converted into a character representation. Besides the actual conversion, the mapping generates a larger amount of data to be sorted. An 80-bit "TReal" floating point number, for instance, when converted to character format, expands out into a character byte string substantially larger than its original 80-bit quantity. This results in further increase in the number of bits which must be processed to perform the sort.

The present invention solves these problems by providing improved radix sorting methodology which allows the sort to be performed on native data types, including those of a non-character format. The resource-expensive approach of converting data types into character representations (and the concomitant increase in data size) is avoided, thereby improving performance of the sort. A radixsort, constructed in accordance with the present invention, provides for a correct interpretation of a group of bits under examination at the point of examination. Although the sorting methodology of the present invention does not maintain complete knowledge of the underlying data types at the time of comparison operations (as that approach is not efficient), it does maintain sufficient information on how a particular set of bits should be interpreted. That knowledge is employed by the radix sorting methodology to determine a "weighting" of each group of bits—how each group should be treated at the point of comparison.

If text string conversion is not used, a new problem presents itself: how does one present to a radix sorting method a description of how to interpret each of the group of bits under examination as the method proceeds across a key or multiple keys (e.g., primary, secondary, and tertiary keys) for data to be sorted. A proper weighting must be provided in order to properly interpret groups of bits, for undertaking a comparison operation for different data types. As will now be described, the system of the present invention provides improved sorting methods which readily solve this problem and thus provide a much improved radixsort methodology.

The following description will focus on modifications made to conventional radix sorting for implementing system and methods of the present invention. The basic techniques of radix sorting, such as the use of bins for assisting with sorting, are set forth in the technical, trade, and patent literature. For a thorough introduction to radix sorting methods, see e.g., McIlroy, P. and Bostic, K., *Engineering Radix Sort*, Computing Systems, Vol. 6, No. 1, Winter 1993, pp. 5–27, the disclosure of which is hereby incorporated by reference.

B. Methodology overview

Figure 3:
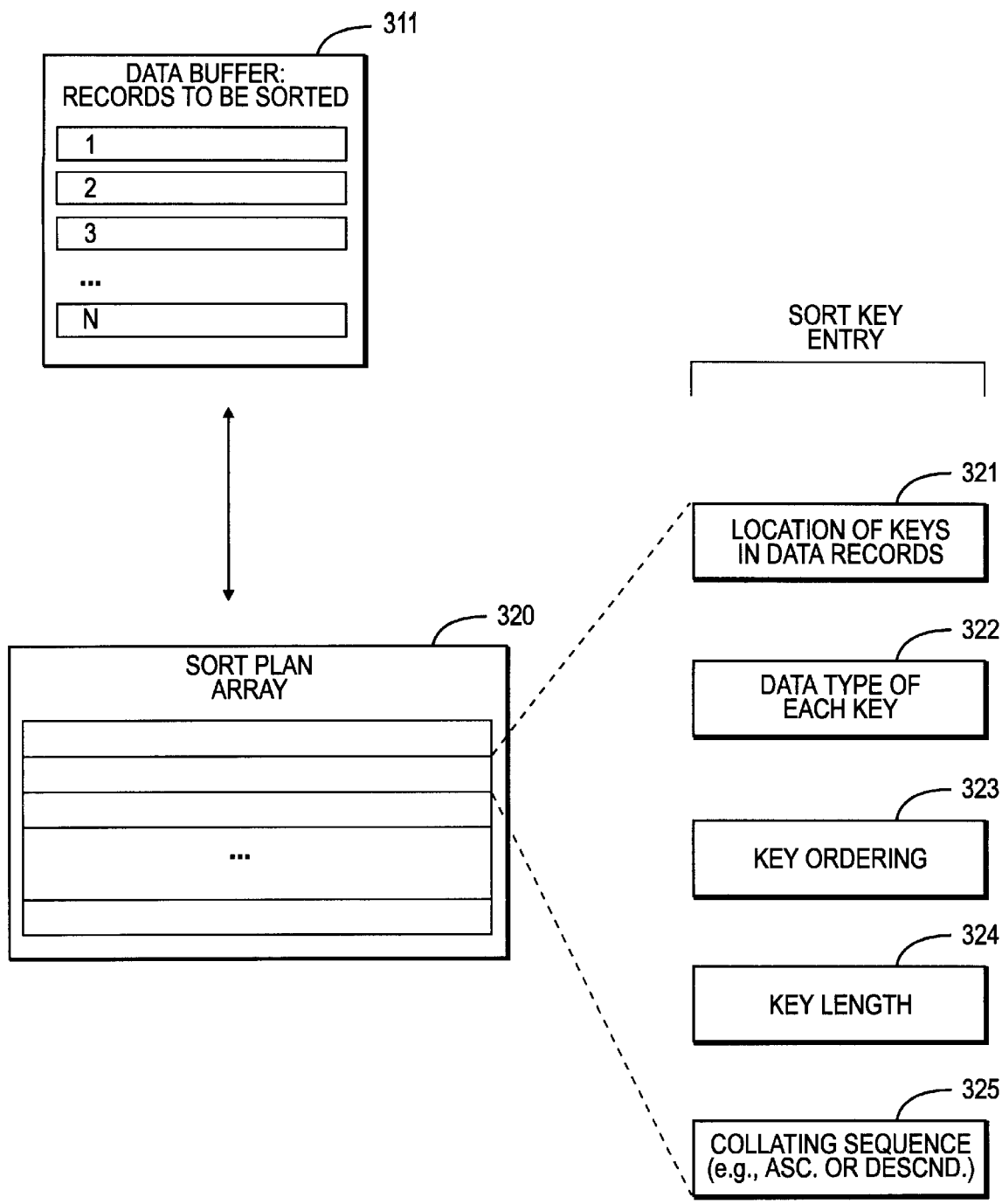
FIG. 3 is a block diagram illustrating information (data structures) processed for implementing improved radix sorting methodology of the present invention.

FIG. 3 is a block diagram illustrating information (data structures) processed for implementing an improved radix sorting method of the present invention. At the outset, data (e.g., database records) to be sorted is passed into the system, such as loading the data in memory buffer 311. In addition to this, information is provided indicating the location of the keys in each record of the data to be sorted, as indicated by 321. In a typical embodiment (e.g., one employed in conventional database tables), this value represents a relative location or offset of the keys within a particular record. Additional information includes the data type of each key 322, the key(s) to be sorted on 323 (i.e., what is the primary sort key, what is the secondary sort key, and so forth and so on), the key length 324 (i.e., the size), and (optionally) the collating sequence 325 (e.g., ascending or descending).

Given this information, the system at a setup stage of the radixsort can formulate a "sort plan," shown at 320. The sort plan itself is broken down into an array of entries; each entry describes the number of bits to examine (e.g., the number 8 for a radix 8 sort), together with information on how to interpret the bits. The group of bits (radix) can be an arbitrary number of bits, for instance, ranging from 8 to 32 bits. For performance reasons, the number of bits to examine typically is selected to optimize alignment of machine words for a particular platform. For typical hardware, the value is limited to no more than 11, to avoid excessive memory requirements. In the event that the sort is processing variable-length keys, the sort plan also describes the length offset, so that the appropriate offset can be found in each key. Additionally, the system tracks a "current position" in the variable-length key. This enables the system to correctly compare entries of different lengths (e.g., comparing an entry of 10 bytes in size against one of only 5 bytes in size).

Figure 4:
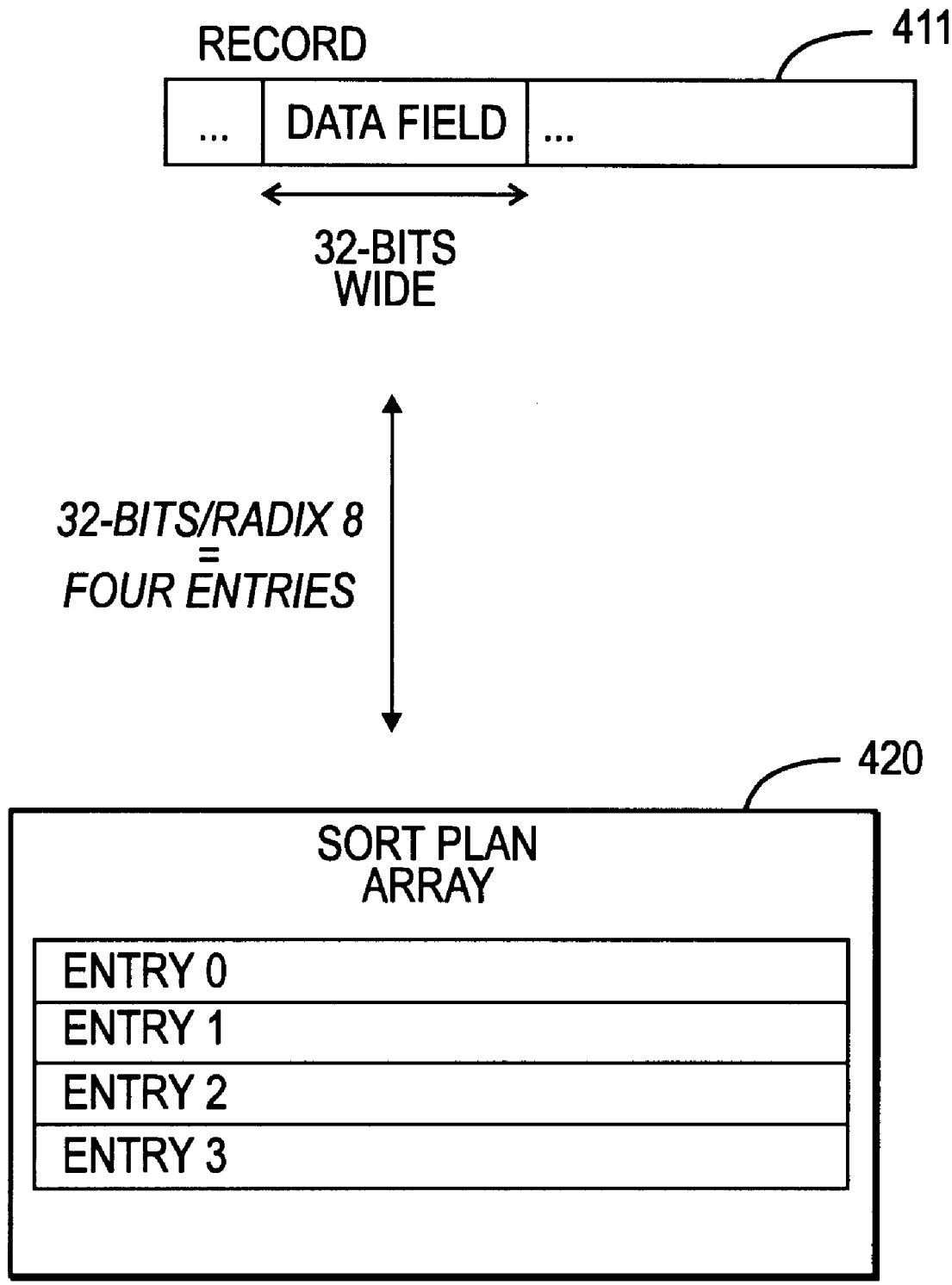
FIG. 4 is a block diagram illustrating construction of a "sort plan" data structure (array) of the present invention.

Consider a radix 8 sorting of a 32-bit data member, such as shown at 411 in FIG. 4. The sorting-context information array appropriate for that data member, illustrated as array 420, comprises four entries (i.e., 32 divided by 8). In an exemplary embodiment, the first entry (entry 0) is defined to represent the most significant portion of the keys. In a corresponding manner, the last entry, here, entry 3, represents the least significant portion. Once this plan is constructed, it is provided to the radix sorting engine which, in turn, "walks" (i.e., traverses) the entries, for performing the sort (i.e., based on the information describing where the bits are and how they are to be interpreted).

The construction of the sort plan or sorting-context information array 420 is done in a manner such that the entries of the array are ordered from most significant bits to least significant bits. This approach allows the system to correctly process all conceivable data types, including not only big-endian and little-endian data types, but also arbitrary data types (e.g., an arbitrary data type having its most significant bits being positioned at an arbitrary location within the data type). Construction of the array entries is undertaken in a manner to simply accommodate any arbitrary ordering scheme which might be present in a data type. During the actual sorting operation, the entries or packets are scanned linearly but the actual location under examination in the key can jump around to any arbitrary position (as appropriate for the data type). Information stored in the array entries indicates to the system which successive groups of bits from a key (or set of keys) which should be examined. Ultimately, the sorting plan provides a mapping of bits from the data type or types under examination which permits an easy bit-based comparison to be performed.

Once the sort plan is constructed, the radixsort can be performed in a straightforward manner, without unnecessary conversion of data types into character-based (or other) data types. Moreover, the sort plan approach easily accommodates multiple keys as well as arbitrary data types among those keys. The engine itself operates generically: it simply operates on the set of bits as specified by the sort plan entries, regardless of the particular data types which comprise the bits or the multiple keys from which the bits are derived. In other words, the sort is performed by processing a sequence of bit sets against a corresponding set of sort plan entries, each entry describing how a particular bit set is to be processed.

C. Data structures employed

Before describing internal operation of the radix sorting methodology of the present invention in further detail, it is first helpful to review data structures which are employed. A principal data structure is the sort plan, SortPlan, which is defined in a C++ class, hs_Sort; the class definition of the hs_Sort class is set forth in Appendix A. SortPlan describes how to interpret the current bits (e.g., byte for an 8-bit radix), for sorting purposes. In an exemplary embodiment, construction of the SortPlan data structure (within the hs_Sort class) is as follows (in the form of an excerpt from the hs_Sort class which is provided in Appendix A), using the C++ programming language.

```
  1: // hs_Sort class definition
  2:
  3: class hs_Sort: public hs_Store
  4: {
     /*
        Removed for the following discussion
        See Appendix A for full class definition
     */
109: private:.                            // ivars
     /*
        Removed . . .
     */
115: enum SortAlgorithm    {QUICK_SORT, RADIX_SORT,
116:                        PARALLEL_RADIX_SORT};
117:
118: //
119: // The SortPlan describes how to interpret the current byte in
120: // regards to sorting purposes. Keys are assumed to be p-tuples
121: //
122: //    (a[p], . . . , a[2],a[1])
123: //
124: // For our purposes, each a[p] is one byte. For a p-tuple key, there
125: // will be p SortPlan entries. Multiple keys are viewed as a
126: // concatenation of the distinct keys such that the order is
127: //
128: //    primary, secondary, tertiary, etc.
129: //
130: // The RadixSort implementation is a most-significant-digit (MSD)
131: // radix method.
132: //
133: // 'CmpType' describes how to interpret the current byte.
134: //
135: //       HS_START_UNSIGNED-MSD of an unsigned key
136: //       HS_UNSIGNED-other non-MSD bytes of an unsigned key
137: //
138: //       HS_START_TWOS_COMPLEMENT-MSD of a twos complement key
139: //       HS_TWOS_COMPLEMENT
140: //       -other non-MSD bytes of a twos complement key
141: //       HS_START_SIGN_MAGNITUDE-MSD of a sign-magnitude key
142: //       HS_SIGN_MAGNITUDE
143: //       -other non-MSD bytes of a sign-magnitude key
144: //       HS_START_VARCHAR-MSD of a variable length key
145: //       HS_VARCHAR-other non-MSD bytes of variable length key
146: //
147: typedef struct SortPlan {
148: enum CmpType       {HS_START_UNSIGNED, HS_UNSIGNED,
149:                     HS_START_TWOS_COMPLEMENT, HS_TWOS_COMPLEMENT,
150:                     HS_START_SIGN_MAGNITUDE, HS SIGN MAGNITUDE,
151:                     HS_START_VARCHAR, HS_VARCHAR};
152:
153: hos_uint_offset;         // byte offset within sort record
154: hos_uint_signbyte;       // byte location having the 'sign' bit
155:                          // (used only for sign/magnitude)
156:
157: CmpType_cmptype;         // current byte comparison type
158:
159: hos uint_lenoffset;      // length offset (used only for
160:                          // variable length keys)
161: hos_uint _curlen;        // current length (used only for
162:                          // variable length keys)
163: };
164:
165: struct SortPlan_sortplan[50];
166: hos_int_MSD[50];                         // MSD sortplan
167: hos_int_LSD[50];                         // LSD sortplan
168: SortAlgorithm_sortalgorithm;
169: hos_int_keysize;
170:
171: };
```

(line numbers added to facilitate the following description)

As shown beginning at line 147, the SortPlan defines a record comprising fields used to describe various kinds of information about the particular set of bits being characterized by the SortPlan entry. At the outset, the SortPlan declares an enumerated type, CmpType, for describing a comparison type for the radix comparison unit—that is, how to interpret the current set of bits (e.g., byte for an 8-bit radixsort) under examination. In an exemplary embodiment, the comparison type is an enumerated data member storing one of the following values.

| | |
|---|---|
| HS_START_UNSIGNED- | MSD of an unsigned key |
| HS_UNSIGNED- | other non-MSD bytes of an unsigned key |
| HS_START_TWOS_COMPLEMENT- | MSD of a twos complement key |
| HS_TWOS_COMPLEMENT- | other non-MSD bytes of a twos complement key |
| HS_START_SIGN_MAGNITUDE- | MSD of a sign-magnitude key |
| HS_SIGN_MAGNITUDE- | other non-MSD bytes of a sign-magnitude key |
| HS_START_VARCHAR- | MSD of a variable length character array key |
| HS_VARCHAR- | other non-MSD bytes of variable length key |

This enumerated type definition will be employed later in the structure, at the _cmptype data member (described below), for describing how to interpret the set of bits which the sorting method is currently examining.

After the enumerated type definition, the SortPlan structure defines a first data member, _offset, for describing where this particular set of bits (being described by the SortPlan entry) resides in the record (i.e., data record) relative to the beginning of the record. This represents the relative location of each bit set. For the first SortPlan entry, for example, this would typically point to the start of the key (e.g., bit 0). Each successive SortPlan entry or packet would point to remaining, corresponding bit sets of the key (or keys). Since, in a preferred embodiment, an 8-bit (byte) radix is employed, the _offset data member stores a byte offset within the sort record. In other words, the _offset data member describes the location of the next 8 bits (byte) that the system is examining (relative to the data record being sorted). Since this data member describes where to find the next set of bits, the system can easily accommodate an arbitrary bit ordering scheme (e.g., most significant bit in the middle of the data type). In the preferred embodiment, the byte offset is relative to the beginning of the record.

For data types which include a sign bit (e.g., floating point number), it is necessary to tell the radixsort method which set of bits (e.g., byte) contains the signed bit. The specific location (in an exemplary embodiment, a byte location) having the "sign" bit is stored by the _signbyte data member. This is only employed with comparison types of signed magnitude. Signed quantities, such as integers, for this approach, are treated as "two's complement" notation. In typical two's complement notation, if the leftmost bit is 1, the value for the number is negative. If the leftmost bit is 0, the value is positive or 0. To convert between positive values and two's complement notation, one first forms a "one's complement" intermediate value by negating each bit—changing the 1s to 0s and the 0s to 1s. Next, 1 is added to this value, for forming the final two's complement result. The result is reversible, by again performing the same steps.

The _cmptype or "comparison type" data member stores the comparison type for the current byte, using the above-described CmpType enumerated type. The comparison type is a mechanism that describes how to interpret the set of bits which the sorting method is currently examining. For instance, this indicates whether a set of bits should be treated as the initial set of bits for an unsigned quantity. As shown by the above enumerated types, the sorting method of the present invention includes, in an exemplary embodiment, information indicating how to interpret a set of bits if it is an unsigned quantity, how to interpret something if it is a two's complement set of bits, how to interpret a set of bits if it is a signed magnitude quantity, and how to interpret a set of bits if it is a variable length character array.

The _lenoffset data member, which is employed only for sorting variable length keys, stores an unsigned integer describing where to find in the record that slot which contains the length of the key—the "length offset." The _curlen or "current length" data member stores an unsigned integer describing the current position of where the sorting method is at, when sorting variable-length keys.

In an exemplary embodiment, an array containing fifty SortPlan entries (or other desired number) is declared in the hs_Sort class:
struct SortPlan _sortplan[50];
If desired, the array can be dynamically allocated at runtime. Following this array, the class declares two arrays which describe the order in which to interpret the sort plan:

| | |
|---|---|
| hos_int_MSD[50]; | // MSD sortplan |
| hos_int_LSDE[50]; | // LSD sortplan |

A Most-Significant-Digit or "MSD" sort plan is employed where a sort proceeds from the most-significant digit to the least-significant digit. A Least-Significant-Digit or "LSD" sort plan, on the other hand, proceeds from the least-significant digit to the the most-significant digit. Each array is an integer array storing values which serve as subscripts for indexing into the SortPlan array.

In addition to knowing the maximum length of each individual key, the sort method needs to track the maximum length of all sort key(s). The hs_Sort class, therefore, also declares an integer variable for storing a "key size" as follows.
hos_int _keysize;
This indicates the absolute maximum length of the sort key(s).

Two other data structures, which comprise read-only tables, describe how to interpret a particular set of bits (i.e., 8 bits in a preferred embodiment). The interpretation itself is based on what kind of comparison is actually required. A first table, TwoCmp, is used to interpret those sets of bits which are marked as two's complement. In an exemplary embodiment (i.e., of radix 8), the table employs 256 entries and may be declared as follows.

```
//
// Following table is used to translates a two's complement
// byte to its corresponding sort order. Used only when
// the compare type for sortplan[i] is HS_TWOS_COMPLEMENT.
//
const hos_byte TwoCmp[ ]= {
    0 × 80, 0 × 81, 0 × 82, 0 × 83, 0 × 84, 0 × 85, 0 × 86, 0 × 87,
    0 × 88, 0 × 89, 0 × 8a, 0 × 8b, 0 × 8c, 0 × 8d, 0 × 8e, 0 × 8f,
    0 × 90, 0 × 91, 0 × 92, 0 × 93, 0 × 94, 0 × 95, 0 × 96, 0 × 97,
    0 × 98, 0 × 99, 0 × 9a, 0 × 9b, 0 × 9c, 0 × 9d, 0 × 9e, 0 × 9f,
    0 × a0, 0 × a1, 0 × a2, 0 × a3, 0 × a4, 0 × a5, 0 × a6, 0 × a7,
    0 × a8, 0 × a9, 0 × aa, 0 × ab, 0 × ac, 0 × ad, 0 × ae, 0 × af,
    0 × b0, 0 × b1, 0 × b2, 0 × b3, 0 × b4, 0 × b5, 0 × b6, 0 × b7,
    0 × b8, 0 × b9, 0 × ba, 0 × bb, 0 × bc, 0 × bd, 0 × be, 0 × bf,
    0 × c0, 0 × c1, 0 × c2, 0 × c3, 0 × c4, 0 × c5, 0 × c6, 0 × c7,
    0 × c8, 0 × c9, 0 × ca, 0 × cb, 0 × cc, 0 × cd, 0 × ce, 0 × cf,
    0 × d0, 0 × d1, 0 × d2, 0 × d3, 0 × d4, 0 × d5, 0 × d6, 0 × d7,
    0 × d8, 0 × d9, 0 × da, 0 × db, 0 × dc, 0 × dd, 0 × de, 0 × df,
    0 × e0, 0 × e1, 0 × e2, 0 × e3, 0 × e4, 0 × e5, 0 × e6, 0 × e7,
    0 × e8, 0 × e9, 0 × ea, 0 × eb, 0 × ec, 0 × ed, 0 × ee, 0 × ef,
    0 × f0, 0 × f1, 0 × f2, 0 × f3, 0 × f4, 0 × f5, 0 × f6, 0 × f7,
    0 × f8, 0 × f9, 0 × fa, 0 × fb, 0 × fc, 0 × fd, 0 × fe, 0 × ff,
    0 × 00, 0 × 01, 0 × 02, 0 × 03, 0 × 04, 0 × 05, 0 × 06, 0 × 07,
    0 × 08, 0 × 09, 0 × 0a, 0 × 0b, 0 × 0c, 0 × 0d, 0 × 0e, 0 × 0f,
    0 × 10, 0 × 11, 0 × 12, 0 × 13, 0 × 14, 0 × 15, 0 × 16, 0 × 17,
    0 × 18, 0 × 19, 0 × 1a, 0 × 1b, 0 × 1c, 0 × 1d, 0 × 1e, 0 × 1f,
    0 × 20, 0 × 21, 0 × 22, 0 × 23, 0 × 24, 0 × 25, 0 × 26, 0 × 27,
```

```
    0 × 28, 0 × 29, 0 × 2a, 0 × 2b, 0 × 2c, 0 × 2d, 0 × 2e, 0 × 2f,
    0 × 30, 0 × 31, 0 × 32, 0 × 33, 0 × 34, 0 × 35, 0 × 36, 0 × 37,
    0 × 38, 0 × 39, 0 × 3a, 0 × 3b, 0 × 3c, 0 × 3d, 0 × 3e, 0 × 3f,
    0 × 40, 0 × 41, 0 × 42, 0 × 43, 0 × 44, 0 × 45, 0 × 46, 0 × 47,
    0 × 48, 0 × 49, 0 × 4a, 0 × 4b, 0 × 4c, 0 × 4d, 0 × 4e, 0 × 4f,
    0 × 50, 0 × 51, 0 × 52, 0 × 53, 0 × 54, 0 × 55, 0 × 56, 0 × 57,
    0 × 58, 0 × 59, 0 × 5a, 0 × 5b, 0 × 5c, 0 × 5d, 0 × 5e, 0 × 5f,
    0 × 60, 0 × 61, 0 × 62, 0 × 63, 0 × 64, 0 × 65, 0 × 66, 0 × 67,
    0 × 68, 0 × 69, 0 × 6a, 0 × 6b, 0 × 6c, 0 × 6d, 0 × 6e, 0 × 6f,
    0 × 70, 0 × 71, 0 × 72, 0 × 73, 0 × 74, 0 × 75, 0 × 76, 0 × 77,
    0 × 78, 0 × 79, 0 × 7a, 0 × 7b, 0 × 7c, 0 × 7d, 0 × 7e, 0 × 7f
};
```

The other table, SgnMag, is employed for interpreting those bits which are marked as having a sign magnitude. In an exemplary embodiment, the table may be constructed as follows.

```
//
// Following table is used to translates a two's complement
// byte to its corresponding sort order. Used only when
// the compare type for sortplan[i] is HS_SIGN_MAGNITUDE.
//
const hos_byte SgnMag[ ] = {
    0 × 80, 0 × 81, 0 × 82, 0 × 83, 0 × 84, 0 × 85, 0 × 86, 0 × 87,
    0 × 88, 0 × 89, 0 × 8a, 0 × 8b, 0 × 8c, 0 × 8d, 0 × 8e, 0 × 8f,
    0 × 90, 0 × 91, 0 × 92, 0 × 93, 0 × 94, 0 × 95, 0 × 96, 0 × 97,
    0 × 98, 0 × 99, 0 × 9a, 0 × 9b, 0 × 9c, 0 × 9d, 0 × 9e, 0 × 9f,
    0 × a0, 0 × a1, 0 × a2, 0 × a3, 0 × a4, 0 × a5, 0 × a6, 0 × a7,
    0 × a8, 0 × a9, 0 × aa, 0 × ab, 0 × ac, 0 × ad, 0 × ae, 0 × af,
    0 × b0, 0 × b1, 0 × b2, 0 × b3, 0 × b4, 0 × b5, 0 × b6, 0 × b7,
    0 × b8, 0 × b9, 0 × ba, 0 × bb, 0 × bc, 0 × bd, 0 × be, 0 × bf,
    0 × c0, 0 × c1, 0 × c2, 0 × c3, 0 × c4, 0 × c5, 0 × c6, 0 × c7,
    0 × c8, 0 × c9, 0 × ca, 0 × cb, 0 × cc, 0 × cd, 0 × ce, 0 × cf,
    0 × d0, 0 × d1, 0 × d2, 0 × d3, 0 × d4, 0 × d5, 0 × d6, 0 × d7,
    0 × d8, 0 × d9, 0 × da, 0 × db, 0 × dc, 0 × dd, 0 × de, 0 × df,
    0 × e0, 0 × e1, 0 × e2, 0 × e3, 0 × e4, 0 × e5, 0 × e6, 0 × e7,
    0 × e8, 0 × e9, 0 × ea, 0 × eb, 0 × ec, 0 × ed, 0 × ee, 0 × ef,
    0 × f0, 0 × f1, 0 × f2, 0 × f3, 0 × f4, 0 × f5, 0 × f6, 0 × f7,
    0 × f8, 0 × f9, 0 × fa, 0 × fb, 0 × fc, 0 × fd, 0 × fe, 0 × ff,
    0 × 7f, 0 × 7e, 0 × 7d, 0 × 7c, 0 × 7b, 0 × 7a, 0 × 79, 0 × 78,
    0 × 77, 0 × 76, 0 × 75, 0 × 74, 0 × 73, 0 × 72, 0 × 71, 0 × 70,
    0 × 6f, 0 × 6e, 0 × 6d, 0 × 6c, 0 × 6b, 0 × 6a, 0 × 69, 0 × 68,
    0 × 67, 0 × 66, 0 × 65, 0 × 64, 0 × 63, 0 × 62, 0 × 61, 0 × 60,
    0 × 5f, 0 × 5e, 0 × 5d, 0 × 5c, 0 × 5b, 0 × 5a, 0 × 59, 0 × 58,
    0 × 57, 0 × 56, 0 × 55, 0 × 54, 0 × 53, 0 × 52, 0 × 51, 0 × 50,
    0 × 4f, 0 × 4e, 0 × 4d, 0 × 4c, 0 × 4b, 0 × 4a, 0 × 49, 0 × 48,
    0 × 47, 0 × 46, 0 × 45, 0 × 44, 0 × 43, 0 × 42, 0 × 41, 0 × 40,
    0 × 3f, 0 × 3e, 0 × 3d, 0 × 3c, 0 × 3b, 0 × 3a, 0 × 39, 0 × 38,
    0 × 37, 0 × 36, 0 × 35, 0 × 34, 0 × 33, 0 × 32, 0 × 31, 0 × 30,
    0 × 2f, 0 × 2e, 0 × 2d, 0 × 2c, 0 × 2b, 0 × 2a, 0 × 29, 0 × 28,
    0 × 27, 0 × 26, 0 × 25, 0 × 24, 0 × 23, 0 × 22, 0 × 21, 0 × 20,
    0 × 1f, 0 × 1e, 0 × 1d, 0 × 1c, 0 × 1b, 0 × 1a, 0 × 19, 0 × 18,
    0 × 17, 0 × 16, 0 × 15, 0 × 14, 0 × 13, 0 × 12, 0 × 11, 0 × 10,
    0 × 0f, 0 × 0e, 0 × 0d, 0 × 0c, 0 × 0b, 0 × 0a, 0 × 09, 0 × 08,
    0 × 07, 0 × 06, 0 × 05, 0 × 04, 0 × 03, 0 × 02, 0 × 01, 0 × 00
};
```

Note that as the radix is increased to a size larger than 8, these two data structures would grow in a corresponding manner.

D. Initialization methods

1. Sortkey class: hs_Sortkey

To sort data, the system creates an instance of the sort class, hs_Sort. First, however, the internal client (i.e., the process or task requiring sorting) provides two data items which are specific to the radixsort, in addition to typical sorting information (e.g., such as a pointer or handle to a block of records to sort). The two items are: the number of keys and an array of key descriptions. The "sortkey" class, hs_Sortkey, is employed for describing the location (in the record) and the data types of each of the keys. In an exemplary embodiment, the class may be constructed as follows.

```
//===========
// hs_Sortkey
//===========
class hs_Sortkey
{
friend class hs_Sort;
public:
    hs_Sortkey() {}
    ~hs_Sortkey() {}
    void Populate(hos_int offset, hos_int length, hos_datatype type,
                        hos_boolean fixed) {
        _offset = offset;
        _length = length;
        _type = type;
        _fixed = fixed;
    }
private:
    hos_int _offset;
    hos_int _length;
    hos_datatype _type;
    hos_boolean _fixed;
};
```

One object instance of the class is created for each key which the data is to be sorted by (i.e., one instance per key). Each object includes four fields which are of interest and which will now be described.

The first field, _offset, describes the most significant bits for the data type of that key (i.e., the key for the object instance). This location is the offset of the key relative to the beginning of the record—that is, where the key begins in the record. The next field, _length, simply stores the length of the key. The third field, _type, stores information describing the data type of the key (e.g., signed integer, unsigned integer, character string, or the like). The last data field, _fixed, serves as a flag indicating whether the key is a fixed-length or variable-length key.

The ordering of the keys themselves occurs as follows. During a sorting operation, several instances of the hs_Sortkey class (i.e., hs_Sortkey objects) are typically created. These object instances are created in the order in which the corresponding keys appear in the record. Therefore, the order in which the Sortkey object instances are created is the same as the order of the keys. This information is used to dictate the ultimate sort.

2. Sort class: hs_Sort (a) Class constructor

When an internal client requires sorting, it creates an object instance of the sort class (hs_Sort), passing a number of parameters or arguments to the constructor of the class. In an exemplary embodiment, two constructors are defined for the sort class; the second one, which is of interest, is as follows.

```
1: // hs_Sort class definition
2:
3: class hs_Sort : public hs_Store
4: {
5:
6: public:
7:
     /*
         Removed for the following discussion
         See Appendix A for full class definition
     */
40:     // Class constructor (#2)
41:     hs_Sort(hos_bio *bio,           // file block i/o
42:             s_bufman *bufman,       // buffer manager
43:             hos_int recsize,        // size of record; if fixed
44:             void *UserPtr,          // for compare function
45:
46:             // compare function for records. k1, k2 are records,
47:             // l1, l2 are record length
48:             hos_int (*Compare) (void * UserPtr,const void *k1,
49:                                 const void *k2,
50:                                 hos_int l1,hos_int l2),
51:
52:             hos_boolean isfixed,         // HOS_TRUE if record size fixed
53:             hos_int NumberBytes,    // size of insert buf (hs_SortNumBytes)
54:             hos_uint NotifyModulus,      // if 0 don't notify, else modulus
55:             const hos_text *NotifyID,    // notify text
56:
57:             hos_int NumHelperInsertThreads,
58:                         // if -1 unlimited insert helper threads,
59:                         // if 0 no helper threads
60:                         // if >0 use up to <value> helper threads
61:
62:             hos_boolean ParallelRetrieve,
63:                         // if HOS_TRUE, parallelize retrieve
64:
65:             hos_int RetrievePipeWidth,       // pipe width, see usage model
66:             hos_izit RetrievePipeLen,        // pipe length, see usage model
67:
68:             hos_StatsObj::SubStatementId majorContext,
69:                         // dfo id or cursor id
70:
71:             MinorContext minContext,    // secondary stats context
72:
73:             hos_int sortkeys,       // sorting keys
74:             hs_Sortkey keys [ ]);   // key descriptions
     /*
         . . .
     */
171: };
```

Two parameters—sortkeys (at line 73) and keys (at line 74)—are of particular interest to the improved radix sorting methods of the present invention. The keys array is an array of hs_Sortkey—that is, an array of object instances of the hs_Sortkey class. The sortkeys parameter indicates how many keys are employed for the sort and, thus, how many entries are stored in the keys array.

(b) Class methods

As previously described, instantiation of the hs_Sort class includes passing in information about the keys, including information about how many keys exist and a description (key description) for each of those keys. With this information, the system will fill out the sort plan description as well as the sort plan order.

The general approach is as follows. The system loops across all the sort keys and determines how to fill out the radix sorting data structures based on the kind (i.e., data type) of the data to be sorted. For instance, if the first key is a fixed-length character field, the system stores information indicating that the first byte examined during radix sorting is a character or unsigned quantity. Based on this information provided by the internal client, the constructor of the hs_Sort class can populate the sort plan. In this fashion, the constructor can establish what kind of comparison operation is required for the particular set of bits being examined at any given point in time during the radixsort. In an exemplary embodiment, such a constructor may be implemented as follows.

```
1: // hs_Sort Constructor
2:
3: hs_Sort::hs_Sort(hos_bio *bio,
4:      s_bufman *bufman,
5:      hos_int recsize,
```

```
 6:        void *UserPtr,
 7:        hos_int (*Compare) (void *UserPtr,const void *k1,
 8:  const void *k2,hos_int l1,hos_int l2)
 9:        hos_boolean isfixed,
10:        hos_int NumberBytes,
11:        hos_uint NotifyModulus,
12:        const hos_text *NotifyID,
13:        hos_int NumHelperInsertThreads,
14:        hos_boolean ParallelRetrieve,
15:        hos_int RetrievePipeWidth,
16:        hos_int RetrievePipeLen,
17:        hos_StatsObj::SubStatementId majorContext,
18:        MinorContext minorContext,
19:        hos_int sortkeys,
20:        hsSortkey keys[]):
21:        hs_Store(bio, bufman, recsize, isfixed, NumberBytes,
22:  NotifyModulus, NotifyID, NumHelperInsertThreads,
23:  ParallelRetrieve, RetrievePipeWidth,
24:  RetrievePipeLen, majorContext, minorContext)
25:  ,_Compare(Compare)
26:  ,_UserPtr(UserPtr)
27: {
28:    _keysize = 0;
29:    for (hos_int i=0; i < sortkeys; i++) {
30:      for (hos_int j=0; j < keys[i]._length; j++) {
31:
32:         switch (keys[i]._type) {
33:         case hos_dtchar:
34:         case hos_dtvchar:
35:            if (keys[i]._fixed) {
36:               _sortplan[j+_keysize]._cmptype = SortPlan::HS_UNSIGNED;
37:               _sortplan[j+_keysize]._Offset = keys[i]._offset + j;
38:            }else {
39:               _sortplan[j+_keysize]._cmptype = SortPlan::HS_VARCHAR;
40:               _sortplan[j+_keysize]._offset = keys [i]._offset + j
41:                  + GetOverHeadVariableSize();
42:
43:               _sortplan[j+_keysize]._lenoffset = 0;
44:               _sortplan[j+_keysize]._curlen = j + 1;
45:            }
46:            break;
47:
48:         case hos_dtubyte:
49:         case hos_dtushort:
50:         case hos_dtuint:
51:         case hos_dtrecid:
52:         case hos_dtdate:
53:         case hos_dttime:
54:         case hos_dtdatetime:
55:               _sortplan[j+_keysize]._cmptype = SortPlan::HS_UNSIGNED;
56:               _sortplan[j+_keysize]._offset = keys[i]i._offset
57:                  + j;
58:            break;
59:
60:
61:         case hos_dtsbyte:
62:         case hos_dtshort:
63:         case hos_dtint:
64:               _sortplan[j+_keysize]._cmptype
65:                  = SortPlan::HS_TWOS_COMPLEMENT;
66:               _sortplan[j+_keysize]._offset = keys[i]._offset
67:                  + j;
68:            break;
69:
70:         case hos_dtfloat:
71:         case hos_dtdouble:
72:               _sortplan[j+_keysize]._signbyte = keys[i]._offset;
73:               _sortplan[j+_keysize]._cmptype
74:                  = SortPlan::HSSIGN_MAGNITUDE;
75:
76:               _sortplan[j+_keysize]._offset = keys[i]._offset
77:                  + j;
78:            break;
79:
80:         default:
81:            break;
82:
83:         }
84:         _MSD[j+_keysize] = j+_keysize;
85:         _LSD[j+_keysize] = keys[i]._length + _keysize - j - 1;
```

```
 86:        }
 87:        switch (keys[i].__type) {
 88:        case hos__dtchar:
 89:        case hos__dtvchar:
 90:             if (keys[i].__fixed)
 91:                     __sortplan[__keysize].__cmptype
 92:                         = SortPlan::HS__START__UNSIGNED;
 93:
 94:             else
 95:                     __sortplan[__keysize].__cmptype
 96:                         = SortPlan::HS__START__VARCHAR;
 97:
 98:                  break;
 99:
100:        case hos__dtubyte:
101:        case hos__dtushort:
102:        case hos__dtuint:
103:        case hos__dtrecid:
104:        case hos__dtdate:
105:        case hos__dttime:
106:        case hos__dtdatetime:
107:                  __sortplan[__keysize].__cmptype
108:                      = SortPlan::HS START__UNSIGNED;
109:
110:                  break;
111:
112:        case hos__dtsbyte:
113:        case hos__dtshort:
114:        case hos__dtint:
115:                  __sortplan[__keysize].__cmptype
116:                      = SortPlan::HS__START__TWOS__COMPLEMENT;
117:                  break;
118:
119:        case hos__dtfloat:
120:        case hos__dtdouble:
121:                  __sortplan[__keysize].__cmptype
122:                      = SortPlan::HS__START__SIGN__MAGNITUDE;
123:                  break;
124:
125:        default:
126:                  break;
127:
128:        }
129:
130:        __keysize += keys[i].__length;
131:
132:   }
133: }
```

As shown at line 29, a loop is established for stepping through each sort key. Additionally, an inner loop is established at line 30, for stepping through each group of bits (e.g., byte for radix of 8) of each key, up to the length of the key (i.e., __length).

At line 32, a switch statement is established which switches on data type (i.e., __type). Here, the comparison type and offset data members of the sort plan are filled out, based on the particular type of the key. For instance, a character data type (tested at line 33) or a variable-length character data type (tested at line 34), lead to the constructor storing a comparison type (i.e., __cmptype) of HS__UNSIGNED at line 36 for a fixed-length character string (tested at line 35), or storing a comparison type of HS__VARCHAR (at line 39). Additionally, the passed-in offset (i.e., the offset passed-in to the constructor) is stored in the sort plan offset data member (e.g., at line 37).

Depending on data type, the length offset (i.e., __lenoffset) data member and current length (i.e., __curlen) data member are filled in as well. For character types, for instance, this information is filled in at lines 43–44. For an integer type, on the other hand, the information is not required and is, therefore, not filled in (as illustrated by the integer case arm at lines 63–68). At the conclusion of the switch or case statement (of lines 32–83), the comparison type and offset data members of the sort plan have been appropriately filled out. If required (based on type), the length offset and current length data members are filled in as well. Once these quantities are filled in, they become static, read-only quantities describing how the bits being sorted are to be interpreted. The inner loop (i.e., "for" loop established at line 30) passes over the data based on the current radix value. For a radix of 8 and data having a width of 32 bits, the loop would exercise four passes, thereby completing four sortplan data structures.

Before the method goes to the next sort key (i.e., proceeds to the next loop iteration for the outer loop established at line 29), the method marks the very first sort plan of each key as a special case. This marking is accomplished by a second switch or case statement, which is established at line 87. How the key is marked depends on the data type; accordingly, the statement at line 87 switches on type (__type) for each key. As illustrated, the comparison type for this sort plan entry of the key is marked with an appropriate "start" identifier, such as HS__START__UNSIGNED, for an unsigned data type. In other words, the method at this point marks the comparison type for the first set of bits only for that key, using the appropriate type. Finally, the method keeps track of how long the total length of the keys is (by storing __keysize at line 130).

In summary, the outer loop goes across each of the keys while the inner loop goes across each of the set of bits within each key. At the conclusion of these loops, the sort plan information has been appropriately filled out, based on the keys and their data types specified by the client. Additionally, at lines 84–85, the method stores information which points back into the sort plan for indicating which key the system is to employ at any given point in time during the radixsort. Since a radixsort can be performed by scanning left-to-right or right-to-left, the method stores information characterizing each scan. Specifically, the _MSD array stores left-to-right scan information, at line 84. The _LSD array, on the other hand, stores right-to-left scan information, at line 85. In the currently preferred embodiment, only the left-to-right information is employed.

At the conclusion of the double loops, the constructor has completed setup of sort plan information. Now, the system is ready for the client to invoke specific methods of the just-created sort object, for effecting radix sorting of the data records.

E. Sorting (engine) methods

In the hs_Sort class, three sorting methods are provided for performing the actual work of a radixsort, as shown by the following method declarations within the hs_Sort class.

```
 1:     // hs_Sort class definition
 2:
 3:     class hs_Sort : public hs_Store
 4:     {
        /*
            Removed for the following discussion
            See Appendix A for full class definition
        */
89:     private:              // methods
90:
        /*
            . . .
        */
98:     void RadixSort(hos_byte **a, hos_int rows);
99:     void RadixSort1(hos_byte **a, hos_int rows,
100:                          hos_int keynum,
101:                          hos_int *count, hos_int *nc,
102:                          hos_int *bmin);
103:
104:    void SimpleSort(hos_byte **a, hos_int rows,
105:                          hos_int keynum);
106:
        /*
            . . .
        */
171:    };
```

Specifically, a RadixSort method is declared at line 98; a RadixSort1 method is declared at lines 99–102; and a SimpleSort method is declared at lines 104–105. Typically, a client seeking a radixsort invokes the RadixSort method or entry point which, during the sort, leads to invocation of the other two methods.

The RadixSort entry point method may, in an exemplary embodiment, be constructed as follows.

```
 1: //
 2: // This function sorts a block of rows (each row is 'rowsize'
 3: // bytes wide). The key starting location is given in terms
 4: // of the key offset. The key offset is the byte offset (from 0)
 5: // within a given row of where the key starts. The
 6: // number of bytes in the key is given by 'keysize'.
 7: //
 8: void hs_Sort::RadixSort(hos_byte **a, hos_int rows)
 9: {
10:    hos_int q;
11:    hos_int count[HOS_MAXUBYTE+1+1], nc, bmin;
12:
13:    nc = bmin = 0;
14:    for (q=0; q < HOS_MAXUBYTE+1+1; q++)
15:            count[q] = 0;
16:
17:    RadixSort1(a, rows, 0, count, &nc, &bmin);
18:
19: }
```

As shown, the method is invoked with an array of pointers to the data, as its first argument or parameter. Here, the system will effect the sort by swapping pointers to the data, instead of the data itself. As is known in the art, once the desired order is achieved by sorting the pointers, the actual data itself can be sorted, if desired, according to the order specified by the then-sorted pointers. As its second parameter, the method takes rows, the number of rows present in the data to be sorted. Since the sort plan which was filled out is a member of the same class (hs_Sort) as the sorting methods, the sort methods have access to the sort plan information. After declaring local (stack) variables, the method sets up a number of bins, at lines 13–15, for sorting the records into various bins. Finally, the method calls into the row workhorse routine—RadixSort1—at line 17.

The RadixSort1 method itself may, in an exemplary embodiment, be constructed as follows.

```
 1: void hs_Sort::RadixSort1(hos_byte **a,
 2:             hos_int rows,
 3:             hos_int keynum, hos_int *count,
 4:             hos_int *nc, hos_int *bmin)
 5: {
 6:     hos_int bigc, c, *cp;
 7:
 8:     stack s[SIZE], *sp, *sp0, *sp1, temp;
 9:
10:     hos_byte **aj, **an, **ak,
11:        **top[HOS_MAXUBYTE+2], *r, *t;
12:
13:     SortPlan::CmpType cmptype
14:        = SortPlan::HS_UNSIGNED;
15:
16:     hos_uint offset;
17:     hos_int sortidx;
18: //
```

-continued

```
19: //    Set up stack
20: //
21:       sp = s;
22:       push(a, rows, keynum);
23:
24:       while (!empty(s)) {
25:         pop(a, rows, keynum);
26:         if (rows < THRESHOLD) {
27:            SimpleSort(a, rows, keynum);
28:            continue;
29:         }
30:         an = a + rows;
31: //
32: //    Make character histograms
33: //
34:         if (keynum == __keysize) {
35:            count[0] = rows;
36:         }else {
37:            sortidx = __MSD[keynum];
38:            offset = __sortplan[sortidx].__offset;
39:            cmptype = __sortplan[sortidx].__cmptype;
40:            if (*nc == 0) {
41:               *bmin = HOS__MAXUBYTE;
42:               hos__boolean RR = 0;
43:               for (ak=a; ak < an; ak++) {
44:                  if (cmptype >= SortPlan::HS__START__VARCHAR) {
45:                     hos__int slen
46:                        = *(hos__int*)
47:                            (*ak+__sortplan[sortidx].__lenoffset);
48:                     c = slen < __sortplan[sortidx].__curlen ? ' '
49:                        : *(*ak + offset);
50:                  }else {
51:                     c = *(*ak + offset);
52:
53:                     switch (cmptype) {
54:                     case SortPlan::HS__START__TWOS__COMPLEMENT:
55:                        c = TwoCmp[c];
56:                        break;
57:
58:                     case SortPlan::HS__TWOS__COMPLEMENT:
59:                        break;
60:
61:                     case SortPlan::HS__START__SIGN__MAGNITUDE:
62:                        c = SgnMag[c];
63:                        break;
64:
65:                     case SortPlan::HS__SIGN__MAGNITUDE:
66:                        if (*(*ak+__sortplan[sortidx].__signbyte)
67:                            & 0x80)
68:                           c = HOS__MAXUBYTE - c;
69:                        break;
70:
71:                     case SortPlan::HS__START__UNSIGNED:
72:                     case SortPlan::HS__UNSIGNED:
73:                     default:
74:                        break;
75:
76:                     }
77:
78:                  }
79:                  if (++count[c+1] == 1) {
80:                     if (c < *bmin)
81:                        *bmin = c;
82:                     (*nc)++;
83:                  }
84:               }
85:            }
86: //
87: // Get more stack space if necessary
88: //
89:            if (sp + *nc > s + SIZE) {
90:               RadixSort1(a, rows, keynum, count, nc, bmin);
91:               continue;
92:            }
93:         }
94: //
95: // Set top[] and push incompletely sorted bins
96: // onto the stack. top[] equals pointers to last
97: // out-of-place element in bins.
98: //
```

-continued

```
 99: // count[] equals counts of elements in bins.
100: //
101: // Before permuting: top[c-1] + count[c] = top[c];
102: // during deal: top[c] counts down to top[c-1]
103: //
104:        sp0 = sp1 = sp;     // stack position of biggest bin
105:        bigc = 2;           // size of biggest bin
106:
107:        top[0] = ak = a + count[0];   // set top[EOS]
108:
109:        for (cp=count + *bmin+1; *nc > 0; cp++) {
110:            while (*cp == 0)   // skip empty piles
111:                cp++;
112:            if (*cp > 1) {
113:                if (*cp > bigc) {
114:                    bigc = *cp;
115:                    sp1 = sp;
116:                }
117:                push(ak, *cp, keynum+1);
118:            }
119:            top[cp-count] = ak += *cp;
120:            (*nc)--;
121:        }
122:        swap(*sp0, *sp1, temp);      // biggest bin last
123: //
124: // Permute misplacements home. Already home:
125: // everything before aj, and
126: // in bin[c]. items from top[c] on.
127: //
128: // Once the 1st diordered bin is done,
129: // (i.e., aj >= ak), aj <- aj + count[c]
130: // connects the bins in a linked list.
131: //
132:        for (aj=a; aj < an; *aj=r,
133:                    aj += count[c],
134:                    count[c]=0) {
135: //
136: // Inner loop:
137: //
138: //    r = next element to put in place
139: //    ak = top[r[i]] = location to put the next element
140: //    aj = bottom of 1st disordered bin
141: //
142:            switch (cmptype) {
143:            case SortPlan::HS_START_TWOS_COMPLEMENT:
144:                for (r = *aj; aj <
145:                    (ak = --top
146:                        [c=GetTwoCmpByte(
147:                            r,
148:                            keynum,
149:                            sortidx,
150:                            _keysize,
151:                            offset)]); ) {
152:                    swap(*ak, r, t);
153:                }
154:                break;
155:
156:            case SortPlan::HS_START_SIGN_MAGNITUDE:
157:                for (r = *aj; aj <
158:                    (ak = --top
159:                        [c=GetSgnMagByte(
160:                            r,
161:                            keynum,
162:                            sortidx,
163:                            _keysize,
164:                            offset)]) ; ) {
165:                    swap(*ak, r, t);
166:                }
167:                break;
168:
169:            case SortPlan::HS_SIGN_MAGNITUDE:
170:                for (r = *aj; aj <
171:                    (ak = --top
172:                        [c=GetMagByte(
173:                            r,
174:                            keynum,
175:                            sortidx,
176:                            _keysize,
177:                            offset)]); ) {
178:                    swap(*ak, r, t);
```

```
179:        }
180:        break;
181:
182:      case SortPlan::HS_START_VARCHAR:
183:      case SortPlan::HS_VARCHAR:
184:        for (r = *aj; aj <
185:          (ak = --top
186:            [c=GetVarByte(
187:              r,
188:              keynum,
189:              sortidx,
190:              _keysize,
191:              offset)]); ) {
192:
193:          swap(*ak, r, t);
194:        }
195:        break;
196:
197:      case SortPlan::HS_START_UNSIGNED:
198:      case SortPlan::HS_UNSIGNED:
199:      case SortPlan::HS_TWOS_COMPLEMENT:
200:      default:
201:        for (r = *aj; aj <
202:          (ak = --top
203:            [c=GetByte(
204:              r,
205:              keynum,
206:              sortidx,
207:              _keysize,
208:              offset)]); ) {
209:
210:          swap(*ak, r, t);
211:        }
212:        break;
213:
214:      }
215:    }
216:  }
217: }
```

This method serves as the main sorting engine. Depending on the number of rows remaining to be sorted, the method will either perform a radixsort or a simple insert sort. Once a certain threshold of rows remain (in a particular bin being sorted), it is actually more efficient to perform a simple insert sort for the remaining data.

At the outset, the method declares local (stack) variables. Then, at lines 18–30, the method sets up its own stack. The structure of the stack itself is as follows.

```
typedef struct {
    hos_byte **_sa;      // pointer to row
    hos_int _sn;         // row 'number'
    hos_int _si;         // 'key' number (0 to keysize-1)
}stack;
```

As shown at the lines beginning at line 24, three items are being pushed and popped from the stack: a pointer to a given row (a), a relative row number for the current row (rows) which indicates remaining rows, and key number (keynum). The keynum data member indicates which MSD entry to begin with (and, therefore, which sort plan entry to employ). At line 24, a "while" loop is established to loop through the stack (which serves as a bin) as long as it is not empty. At line 22, the method pops off a structure defining how big the bin is. In an exemplary embodiment, pop and its counterpart push are implemented as macros and may be defined as follows.

```
#define pop(a, n, i)    a = (--sp)->_sa, n = sp->_sn, i = sp->_si
#define push(a, n, i)   sp->_sa = a, sp->_sn = n, (sp++)->_si = i
```

If the number of rows remaining in the bin is less than a predefined threshold value (tested at line 26), the method then invokes a simple insert sort routine (at line 27), for completing sorting of records in that bin. In an exemplary embodiment, the threshold and stack size are defined as follows.

```
#define THRESHOLD   20      /* 20 divert to simplesort */
#define SIZE        512     /* default stack size */
```

Otherwise, the method tracks how large the bin is, at line 30. Specifically, the local variable an stores a pointer to the last row in the bin.

In the event that the method has not reverted to simple insert sort, the method continues on to line 31 for undertaking radix sorting. Here, the method will undertake to compute histograms based on the size of the radix. Since the preferred embodiment employs a radix of 8, these histograms will be referred to as "character histograms." If the method has at this point examined all the keys (i.e., keynum is equal to _keysize, tested at line 34), then the method has completed its comparison for this bin. This is indicated by setting bin number 0 (i.e., a reserved bin) to rows, thereby marking the end. Otherwise, the method proceeds to the "else" statement beginning at line 36.

At this point, a radixsort is to be performed, therefore the method refers to the sort plan for determining how to interpret the bits. Specifically, at line 37, the method grabs an index from the MSD array (using keynum), for determining which sort plan entry to use.

At lines 38–39, the offset and compare type data members from the appropriate sort plan entry are read into local variables, offset and cmptype. In other words, from the sort plan index the method can determine where to look in the record (i.e., offset) and what type of comparison is required (cmptype).

Now, the method will construct a character histogram— that is, how many counts of each bit pattern exist in the bin for a particular set of bits under examination. Here, the method is interested in finding that set of bits which has the lowest number of elements in it. Because the radix employed is radix 8, at most 256 unique values can exist for a given set of bits. The method proceeds by subdividing the data into various bins and tracks which group has the least number of members.

At line 43, the method establishes a "for" loop for looping across all the rows in the current bin. Based on the comparison type of the current set of bits being examined, the method will assign a bin number. Here, the bin number is a function of what kind of comparison type the bits comprise. For example, if the comparison type is a variable-length character (at line 44), the method will pick the next byte in the record or assign a space character in the event that all bytes were characters or exhausted, as illustrated at lines 48–49. This assigns the bits to a particular bin. Here, the length offset (_lenoffset) is employed to get to the set of bits; the current length _curlen is employed so that the method will not overrun the data (i.e., go past the last bit in the data).

For the other comparison types, the method gets the next bin number, which is biased according to what kind of comparison is occurring. For a two's complement comparison type, the previously-described two's complement lookup table is employed for assigning a weighting or bias (lines 54–56). From the lookup table, for example, the two's complement value of 0d has a weighting of 80h; a two's complement value of 128d, on the other hand, has a weighting of 0h. Note, however, that this weighting is only done for the "start" set of bits. It is not required for the other bit sets in the two's complement, such as indicated by the case arm at line 58–59.

Treatment of the starting bits of a sign magnitude quantity is indicated at lines 61–63. Here, a weighting is assigned at line 62, using the sign magnitude lookup table. If the bits are the non-start bits of a sign magnitude quantity, the sign bit of the quantity is checked, for determining whether it requires biasing. This is done by looking up in the sort plan the location of the sign bit in the key. If the sign bit is set (i.e., the "if" statement at line 66 evaluates to "true"), the sign bit is biased. For the comparison types of unsigned (whether start or non-start), no processing is required for this loop, as indicated by lines 71–72, which fall through to the break statement at line 74.

The method at this point is looping through all the rows in the bin and counting up the number of occurrences in each bit pattern. When needed (as required by comparison type), the method applies a bias to those bits which, based on their comparison type, require biasing, so that those bits are sorted into a correct position. Here, bin 0 is reserved. Bin 1 contains those values which occurred before bin 2. Bin 2, in turn, includes those values which sort before those in bin 3, and so forth and so on. At this point, the method has taken one complete pass through the bin for constructing histogram information. Actual sorting has not yet occurred. Now, the method is ready to reorder each record in the bin.

The method may now rearrange records within the bin, applying the same information from the sort plan which specifies comparison type. This is shown by the switch statement, established at line 142, which switches on comparison type. If the method has not exhausted the bits being examined, then it applies the appropriate weighting from the lookup tables (for start two's complements, start sign magnitude, and sign magnitude), swapping as needed. For a variable-length character quantity or unsigned quantity, the method gets the bits from the workgroup and performs any necessary swapping. "Swapping" itself can be implemented as a simple macro as follows.

define swap(a, b, t) t=a, a=b, b=t

As shown, the method simply swaps two values, in this case pointers to data records. The method continues at this point until records within the current bin are correctly sorted.

F. Simple insert sort method

In the event that the records remaining for a bin drop below the pre-selected threshold, the RadixSort1 method reverts to simple insertion sort. In an exemplary embodiment, a simple insertion sort method, SimpleSort, may be constructed as follows.

```
 1: void hs__Sort::SimpleSort(hos__byte **a,
 2:              hos__int rows, hos__int keynum)
 3: {
 4:       hos__byte **ak, **ai, *s, *t;
 5:
 6:       for (ak=a+1; --rows >= 1; ak++) {
 7:           for (ai=ak; ai > a; ai--) {
 8:
 9:               hos__boolean swapvalues = HOS_TRUE;
10:
11:               hos__int b = keynum;
12:               hos__int sortidx = __MSD[b];
13:
14:               if (__sortplan[sortidx].__cmptype
15:                   >= SortPlan::HS__START__VARCHAR) {
16:                   hos__int slen, tlen;
17:
18:                   slen = *(hos__int*) (ai[0]+__sortplan[sortidx].__lenoffset);
19:                   tlen = *(hos__int*) (ai[-1]+__sortplan[sortidx].__lenoffset);
20:
21:                   for (s = ai[0]+__sortplan[sortidx].__offset,
22:                        t = ai[-1]+__sortplan[sortidx].__offset;
```

```
23:            b < _keysize && *s == *t &&
24:            slen >= sortplan[sortidx]._curlen &&
25:            tlen >= sortplan[sortidx]._curlen;
26:            b++, sortidx=_MSD[b], s = ai[0]+_sortplan[sortidx]._offset,
27:                t = ai[-1]+_sortplan[sortidx]._offset);
28:        if (b == _keysize)
29:            break;
30:
31:        hos_byte svalue =slen < _sortplan[sortidx.]._curlen ? ' ' : *s;
32:        hos_byte tvalue =tlen < _sortplan[sortidx]._curlen ? ' ' : *t;
33:        if (svalue >= tvalue)
34:            swapvalues = HOS_FALSE;
35:
36:    }else {
37:        for (s = ai[0]+_sortplan[sortidx]._offset,
38:             t = ai[-i]+_sortplan[sortidx]._offset;
39:             b < _keysize && *s == *t; ) {
40:            b++;
41:            if (b >= _keysize)
42:                break;
43:            sortidx = _MSD[b];
44:            s = ai[0]+_sortplan[sortidx]._offset;
45:            t = ai[-1]+_sortplan[sortidx]._offset;
46:        }
47:
48:        if (b >= _keysize)
49:            break;
50:
51:        switch (_sortplan[sortidx]._cmptype) {
52:        case SortPlan::HS_START_TWOS_COMPLEMENT:
53:            if (TwoCmp[*s] >= TwoCmp[*t])
54:                swapvalues = HOS_FALSE;
55:            break;
56:
57:        case SortPlan::HS_START_SIGN_MAGNITUDE:
58:            if (SgnMag[*s] >= SgnMag[*t])
59:                swapvalues = HOS_FALSE;
60:            break;
61:
62:        case SortPlan::HS_SIGN_MAGNITUDE:
63:            if (*(ai[0]+_sortplan[sortidx]._signbyte) & 0x80) {
64:                if (HOS_MAXUBYTE-*s >= HOS_MAXUBYTE-*t)
65:                    swapvalues = HOS_FALSE;
66:            }else {
67:                if (*s >= *t)
68:                    swapvalues = HOS_FALSE;
69:            }
70:            break;
71:
72:        case SortPlan::HS_START_UNSIGNED:
73:        case SortPlan::HS_UNSIGNED:
74:        case SortPlan::HS_TWOS_COMPLEMENT:
75:            if (*s >= *t)
76:                swapvalues = HOS_FALSE;
77:            break;
78:
79:        }
80:    }
81: //
82: // Swap entire row
83: //
84:        if (swapvalues)
85:            swap(ai[0], ai[-1], s);
86:    }
87:  }
88: }
```

This method also employs the SortPlan data structure of the present invention for determining what type of weighting to give a particular set of bits under examination. Thus, the weightings carry through to the insertion sort as well. To figure out which sort plan to apply, the SimpleSort method employs the MSD array, for instance at lines 26–27. The general approach of the method is to start at the first record and cycle through the other records in the bin until the correct location to insert the record is found. Once that location is found, the record is inserted. The "if" statement of lines 14–45 handles variable-length records. The "else" statement at lines 36–80, on the other hand, handles fixed-length data. If a swap is required, a "swap values" flag is set. At line 84, the flag is tested; in the event that the flag is set to "true," the method swaps the record at line 85, using the previously-described swap macro.

In sum, the general approach of the method is as follows. So long as the bit sets being compared are equal, the method simply loops to the next bit sets for comparison. Upon comparing bit sets which are not equal, the method undertakes steps for swapping the records. How the two are actually swapped is a function of the kind of comparison type required for the current set of bits under examination. Based on comparison type, for instance, the method might employ one of the above-mentioned lookup tables.

Benchmark test results

The radix methodology of the present invention (radix8) has been tested against conventional quicksort (quicksort) methodology, yielding the following comparative benchmarks. Each test sorts 524,288 records comprising data generated with a conventional, software-implemented random number generator.

Test 0: Sorting already sorted unsigned integers
  radix8: 2.98 secs
  quicksort: 6.18 secs
Test 1: Sorting unsigned integers
  radix8: 2.82 secs
  quicksort: 10.03 secs
Test 2: Sorting signed integers
  radix8: 2.74 secs
  quicksort: 9.88 secs
Test 3: Sorting floats
  radix8: 4.37 secs
  quicksort: 11.3 secs
Test 4: Sorting unsigned integer (primary key) and signed integer (secondary key)
  radix8: 2.89 secs
  quicksort: 9.09 secs
Test 5: Sorting fixed length character (8 character length)
  radix8: 4.29 secs
  quicksort: 15.19 secs
Test 6: Sorting variable length character (upto 40 character length)
  radix8: 10.12 secs
  quicksort: 14.85 secs
Test 7: Sorting signed integers (high, low, medium)
  radix8: 3.12 secs
  quicksort: 6.46 secs
Test 8: Sorting double
  radix8: 4.37 secs
  quicksort: 12.37 secs
Test 9: Sorting unsigned integers (Poisson distribution lambda=1)
  radix8: 2.96 secs
  quicksort: 4.04 secs
Test 10: Sorting double with negative exponential distribution (lambda=4)
  radix8: 4.24 secs
  quicksort: 12.06 secs An exemplary driver program for generating the comparative benchmarks is appended herewith as Microfiche Appendix B.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a computer system storing a database comprising a plurality of data records, an improved method for sorting data records, the method comprising:

specifying a sort order which the data records are to be sorted according to, said sort order indicating at least one field of the data records which the data records are to be sorted by, wherein said at least one field is capable of storing a data type having an arbitrary bit ordering;

setting a radix value indicating how contiguous bits from said at least one field are to be grouped into bit sets regardless of data types which comprise said at least one field, each bit set serving as a unit for comparison during the sort;

creating sort plan information specifying a particular sequence of bit sets from said at least one field which are to be compared during the sort and specifying a comparison type for each particular bit set, said sort plan information being capable of specifying an arbitrary sequence of said bit sets to be compared during the sort, said comparison type indicating how each bit set is to be interpreted upon comparison; and sorting the data records by performing at least a radixsort on the data records based on said sort plan information.

2. The method of claim 1, wherein said radix value is a pre-selected value selected from a range of 8 to 11.

3. The method of claim 2, wherein said radix value is set equal to 8.

4. The method of claim 1, wherein said at least one field includes information having a non-character data type.

5. The method of claim 1, wherein the sort order comprises ordering the data records according to key values stored by a single field.

6. The method of claim 1, wherein the sort order comprises ordering the data records according to key values stored by multiple fields.

7. The method of claim 1, wherein the sort order specifies an ascending sort order.

8. The method of claim 1, wherein the sort order specifies a descending sort order.

9. The method of claim 1, wherein said sort plan information references additional information which allows the system to determine an appropriate weighting for particular bit sets.

10. The method of claim 9, wherein said additional information comprises a two's complement lookup table.

11. The method of claim 9, wherein additional information comprises a signed magnitude lookup table.

12. The method of claim 1, wherein said sorting step includes:

examining successive bit sets from the data records and applying an appropriate weighting to each particular bit set.

13. The method of claim 1, wherein said at least one field comprises a non-character data type and wherein the sort is completed without converting values from said at least one field into a character data type.

14. The method of claim 1, wherein said method includes sorting said data records into a plurality of bins according to a bit set histogram determined at a particular bit set position within said at least one field.

15. The method of claim 14, wherein each bin is further sorted according to a radixsort until a pre-selected threshold value of data records remaining in the bin is reached, whereupon data records which remain in the bin are sorted by performing an insertsort.

16. The method of claim 1, wherein said comparison type is a selected one of an unsigned key, a two's complement key, a sign-magnitude key, and a character array key.

17. The method of claim 1, wherein said radix value is set equal to 32.

18. The method of claim 1, wherein said sorting method is performed by the first swapping pointers which point to said data records.

19. The method of claim 1, wherein the radix value is selected as a value based on how machine words are aligned in memory for the computer system.

20. The method of claim 1, wherein said sort plan information includes an array of entries describing how the system is to treat sets of bits from said at least one field at comparison time, said array being ordered from most-significant bits to least-significant bits of each said at least one field.

21. In a data processing system, an improved method for sorting data records according to at least one sort key, each sort key comprising key values derived from a particular field of the data records, said particular field comprising a data type capable of having an arbitrary bit ordering, the method comprising:

based on said at least one sort key, constructing a sort plan specifying sets of bits from said at least one sort key which are to undergo comparison as a group and specifying how each set of bits is to be interpreted at the point of comparison, based on underlying data types which comprise said at least one sort key, said sort plan being capable of specifying an arbitrary sequence of said bit sets to be compared during the sort; and performing a sort by examining successive sets of bits and ordering each data record according to how the bits which the bit sets each comprise are interpreted at the point of comparison.

22. The method of claim 21, wherein said sort plan indicates where bits for the bit sets are located in said at least one sort key.

23. The method of claim 22, wherein where bit sets are located is indicated as an offset value pointing to where a particular bit set occurs within a sort key.

24. The method of claim 22, wherein each bit set comprises a number of bits fixed at a particular radix value.

25. The method of claim 24, wherein said radix value is set equal to 8.

26. The method of claim 21, wherein said at least one sort key includes a non-character data type.

27. The method of claim 21, wherein said at least one sort key includes a variable-length character data type.

28. The method of claim 21, wherein said sort plan references information indicating a particular weighting which a particular set of bits is accorded, based on an underlying data type for the sort key which the particular set of bits is taken from.

29. The method of claim 21, wherein said weighting is further based on a bit position of the particular set of bits relative to other bits of that underlying data type.

30. The method of claim 21, wherein said sort plan indicates a comparison type for each bit set, each comparison type indicating how a particular set of bits is to be interpreted at the point of comparison based on underlying data type.

31. In a computer-implemented radixsort process, an improved method for performing comparisons during radix sorting of data records, said data records storing at least one data field to sort on that comprises a data type capable of having an arbitrary bit ordering, the method comprising:

determining a comparison type and weighting for indicating how each particular set of bits is to be interpreted during comparison operations of the radixsort, said step specifying a particular sequence for comparing sets of bits for a data type capable of having an arbitrary bit ordering; and performing comparison operations on original bits taken from the data records, each comparison operation interpreting the original bits according to said specified particular sequence and said determined comparison type and weighting which indicates how each particular set of bits is to be sorted.

32. The method of claim 31, wherein the radixsort is a radix 8 sort and wherein each set of bits comprises 8 bits.

33. The method of claim 31, wherein original bits employed during comparison operations are ones which are taken without conversion from corresponding bits in the data records.

34. The method of claim 31, further comprising:

determining a location of each bit set relative to the beginning of a data field from which the bit set is derived.

35. The method of claim 34, further comprising:

storing sequence information allowing bit sets to be taken from arbitrary locations of a data field which the data records are to be sorted by.

36. A system for sorting data records comprising:

a computer storing a database of data records;

means for sorting data records by at least one field, said means comprising:

means for selecting original bit sets from said at least one field, said bit sets having a fixed length and an arbitrary ordering, means for indicating how each original bit set is to be interpreted upon comparison during the sort, including indicating a particular sequence in which the original bit sets are to be compared, and means for ordering the data records according to interpretation of individual bit sets at the point of comparison.

37. The system of claim 36, wherein said radix value is a pre-selected value selected from a range of 8 to 11.

38. The system of claim 36, wherein said radix value is set equal to 8.

39. The system of claim 36, wherein said at least one field includes information having a non-character data type.

40. The system of claim 36, wherein said interpreting means includes lookup means for determining a particular weighting for a set of bits being compared.

41. The system of claim 40, wherein said lookup means comprises a two's complement lookup table.

42. The system of claim 40, wherein lookup means comprises a signed magnitude lookup table.

* * * * *